(12) United States Patent
Kato

(10) Patent No.: US 7,715,875 B2
(45) Date of Patent: May 11, 2010

(54) BASE STATION CONTROLLER FOR RADIO COMMUNICATION NETWORK AND METHOD OF COLLECTING ALARM INFORMATION THEREOF

(75) Inventor: Ayako Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 601 days.

(21) Appl. No.: 11/377,570

(22) Filed: Mar. 17, 2006

(65) Prior Publication Data

US 2006/0217156 A1  Sep. 28, 2006

(30) Foreign Application Priority Data

Mar. 23, 2005  (JP) .............................. 2005-084138

(51) Int. Cl.
*H04M 1/00* (2006.01)
(52) U.S. Cl. ........................ 455/560; 370/241; 370/242; 370/216; 370/218; 370/341; 370/395.52; 455/423
(58) Field of Classification Search .................. 455/560, 455/423; 370/241, 242, 395.52, 216, 218, 370/341
See application file for complete search history.

(56) References Cited

U.S. PATENT DOCUMENTS 6,775,542 B1 * 8/2004 Vilander et al. ............. 455/423

| | | | | |
|---|---|---|---|---|
| 7,103,002 B2 * | 9/2006 | Bjelland et al. | ............. | 370/242 |
| 7,583,593 B2 * | 9/2009 | Guichard et al. | ............ | 370/225 |
| 7,590,051 B1 * | 9/2009 | Skalecki et al. | ............. | 370/218 |
| 2005/0063701 A1 * | 3/2005 | Ovadia et al. | ................. | 398/45 |
| 2005/0105462 A1 * | 5/2005 | Belotti et al. | ............... | 370/216 |
| 2005/0122908 A1 | 6/2005 | Soumiya et al. | | |
| 2006/0126503 A1 * | 6/2006 | Huck et al. | .................. | 370/225 |

FOREIGN PATENT DOCUMENTS

| | | |
|---|---|---|
| EP | 1 531 634 A1 | 5/2005 |
| JP | 2004-32333 A | 1/2004 |
| JP | 2004-194064 A | 7/2004 |
| JP | 2004-247823 A | 9/2004 |

* cited by examiner

*Primary Examiner*—Rafael Pérez-Gutiérrez
*Assistant Examiner*—Liton Miah
(74) *Attorney, Agent, or Firm*—Sughrue Mion, PLLC

(57) ABSTRACT

Disclosed is a base station controller including processing units classified into a C-plane, a U-plane, and a T-plane. A plurality of subunits are provided in each plane, each subunit having a controller and a plurality of processing entities. Each controller of each subunits maintains a table which indicates the relationship among a name of the message transmitted and received by the C-plane to and from the outside in order to set up a call, a service identifier of the call which is set up using the message; and a name of the process entity which processes the call. Upon detection of a call failure, each plane controller searches the table with a message name, a user identifier, and a service identifier of the call. Then, each plane controller outputs alarm information including the user identifier, a subunit identifier, and the process entity name into a storage device.

7 Claims, 3 Drawing Sheets

| MESSAGE NAME | SERVICE ID | PROCESS ENTITY | | |
|---|---|---|---|---|
| | | C-PLANE | U-PLANE | T-PLANE |
| A | VOICE CALL | L3A,L3B | - | L1A,L2C |
| | PACKET (STREAMING) | L2B,L3C | L1A | - |
| | PACKET (INTERACTIVE) | L2C | L3B,L3C | - |
| | STANDBY | L3A,L3C | - | L3A,L2B |
| | ... | ... | ... | ... |
| B | VOICE CALL | L3A,L3B | - | L1A,L2C |
| | ... | ... | ... | ... |
| ... | ... | ... | ... | ... |

FIG.3

BASE STATION CONTROLLER FOR RADIO COMMUNICATION NETWORK AND METHOD OF COLLECTING ALARM INFORMATION THEREOF

BACKGROUND OF THE INVENTION

1. Field of the Invention

The present invention relates to a base station controller for a radio communication network, and particularly, to a technique for collecting information upon occurrence of communication failure.

2. Description of the Related Art

Functions of a base station controller (or, Radio Network Controller (RNC)) in a radio communication network are classified into a C-plane (Control-Plane), a U-plane (User-Plane), and a T-plane (Transport-plane). The C-plane handles a call setup control process. The U-plane handles a user data transmission process. The T-plane handles an interface termination process.

Each plane includes a plurality of subunits having the same functions, respectively. The subunits take partial charge of the functions of the plane to which they belong. Generally, there exists a plurality of subunits having similar functions in the same plane.

Each of subunits has a controller and a plurality of process entity for executing the process to be handled by the subunit.

Japanese Patent Application Laid-Open No. 2004-032333 (Literature 1), Japanese Patent Application Laid-Open No. 2004-194064 (Literature 2), and Japanese Patent Application Laid-Open No. 2004-247823 (Literature 3) disclose such a prior art. These literatures, however, omit description about the T-plane.

A communication operator manages a base station controller in such a radio communication network. The communication operator, upon receiving a claim from a user, investigates its cause. To perform such investigation, the communication operator needs a tool for collecting only the minimum necessary information.

For example, upon receiving a claim from a user notifying that an abnormal call release occurred, the communication operator needs to identify the cause of error. In order to identify the cause of error, the communication operator has to identify the subunit in which the error occurred, and to identify the process entity which caused the error in this subunit. Further, the communication operator collects information relating to all of the processing entities which handled the abnormally released call. The communication operator tries to investigate the cause based on the collected information.

The collected information does not only include the information relating to parts which caused the error but also includes the information relating to parts which did not cause the error. Since enormous is the quantity of the information to be collected and to be analyzed, it takes long time for the communication operator to identify the part or parts which brought the error of the specified call.

The base station controller processes an enormous number of calls. Therefore, due to the enormous amount of data to be collected and analyzed, investigating the cause takes a long time. Additionally, in a radio network system supporting multi-call, the amount of data per user increases.

SUMMARY OF THE INVENTION

The first exemplary aspect of the invention provides a base station controller and a method of collecting alarm information thereof, which can provide the operator with minimum necessary information in order to quickly respond to a claim from a user.

According to a first exemplary aspect of the invention, there is provided a base station controller including processing units classified into a C-plane, a U-plane, and a T-plane. A plurality of subunits are provided in each plane, each subunit having a controller and a plurality of processing entities. According to the first exemplary aspect of the invention, each controller of each subunits maintains a table which indicates the relationship among a name of the message transmitted and received by the C-plane to and from the outside in order to set up a call, a service identifier of the call which is set up using the message; and a name of the process entity which processes the call. Upon detection of a call failure, each plane controller searches the table with a message name, a user identifier, and a service identifier of the call. Then, each plane controller outputs alarm information including the user identifier, a subunit identifier, and the process entity name into a storage device.

The message transmitted and received by the C-plane is classified into a normal-message for connecting a call and a release-message for releasing a call. The controller of the C-plane can use the occasion when a normal-message reaches time-out, for example, as the condition for outputting alarm information.

Upon detection of failure in multi-call which establishes a plurality of calls for a single call-connection request, the C-plane controller determines which call may be influenced by the failure and sends, to each plane controller, an error notification with regard to the call which may be influenced. It is similar with cases other than multi-call, too.

According to the first exemplary aspect, each C-plane controller sends, to each plane controller, an error notification including the message name, the user ID, and the service ID, if the condition of alarm information output is satisfied in each plane controller. In response to the error notification, each plane controller searches a table in the controller based on the message name and the service ID within the error notification. Then, each plane controller outputs the alarm information including the user identifier, the subunit identifier, and the process entity name into a storage device.

According to the first exemplary aspect it is possible to notify a communication operator of minimum necessary alarm information concerning the call from a specific user. Therefore, since the operator can promptly collect minimum necessary alarm information about the claim from a single user, complaints of individual users can be quickly solved.

In this aspect, the controller of each subunits extracts the information only related to entities which caused the error in the specified user's specified call on the basis of the table. Namely, the information collected by this aspect does not contain the information not directly related to the error. Since the quantity of the information collected by this aspect is much less than that of information collected by the related art, The communication operator can identify quickly the parts which caused the error in the specified call of the specified user by analyzing such small amount of the information.

BRIEF DESCRIPTION OF THE DRAWINGS

FIG. 3 is diagram illustrating an example of a table used in the embodiment of the present invention.

DETAILED DESCRIPTION OF THE PREFERRED EMBODIMENTS

Figure 1:
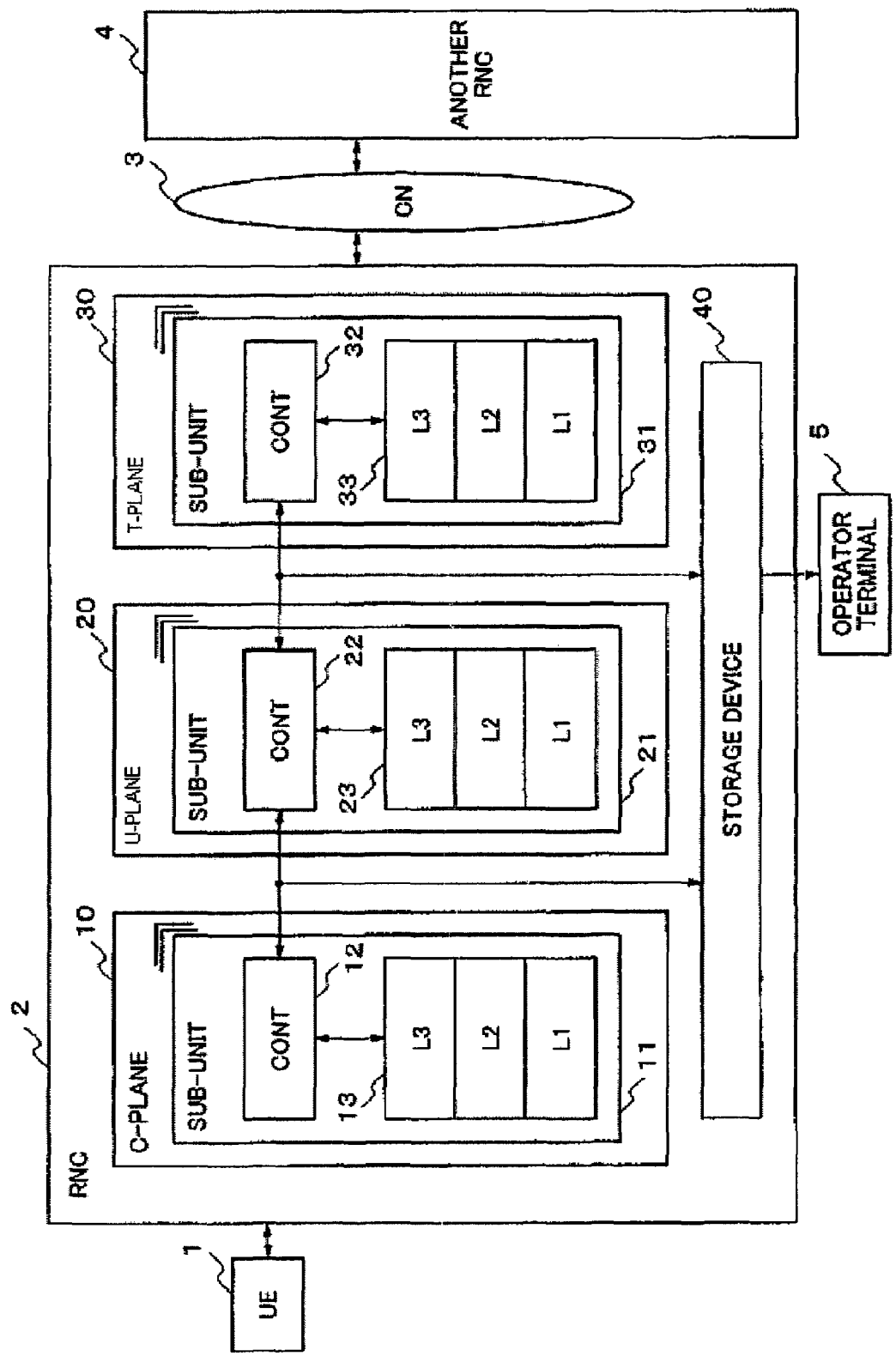
FIG. 1 is a block diagram illustrating an exemplary embodiment of a base station controller according to the present invention.

FIG. 1 is a block diagram illustrating an exemplary embodiment of a base station controller in a radio communication network according to the present invention.

A base station controller 2 includes a C-plane 10 which executes call setup control, a U-plane 20 which executes user data transmission process, and a T-plane 30 which executes physical interface termination. The base station controller 2 also includes a storage device 40 for notifying alarm information to an operator terminal 5. Each call is identified by a user identifier and a service identifier.

The C-plane 10 executes, for example, a process for terminating a signaling protocol of the control plane in 3GPP. The U-plane 20 executes, for example, a process of a user plane protocol of the UMTS Radio network Layer. The T-plane 30 executes a process relating to an interface.

Each plane has a plurality of subunits 11, 21 and 31 for each of a series of functions. Note that although only a single subunit is shown in each plane in FIG. 1, each plane actually includes one or more subunits. The subunits are identified by a subunit identifier.

Each of the subunits 11, 21 and 31 includes a plurality of process entities L1, L2 and L3 provided for each function. In addition, each subunit respectively includes controllers 12, 22 and 32. The controllers control the operation of the process entities L1, L2 and L3 in the same subunit. Additionally, upon occurrence of an error in any of the process entities in the same subunit, the controller notifies the information to other subunits and executes the process described below. Each of the process entities has a process entity name assigned thereto. In FIG. 1, individual process entities are indicated as L1, L2 and L3.

The base station controller 2 processes the following three types of calls. The first type is a call originated by the user equipment (UE) existing in the area controlled by the base station controller itself. The second type is a call arrived from a user equipment in another radio/wired communication network 3. The third type is a call handled by another base station controller 4, i.e., a call relocated to its own base station controller, as the user equipment moves.

A Call is identified by a user identifier for uniquely identifying the user equipment within the radio communication network 3 and a service identifier indicating the service within the radio communication network 3.

Connection pattern of each user equipment includes Single-call which establishes one call, and Multi-call which establishes a plurality of calls. Multi-call includes Circuit Switched (CS)+Packet Switched (PS), CS+CS, and the like.

Here, error information collecting in the base station controller 2 will be described for an exemplary case of failure occurrence at L1 within the process entity 23 of the U-plane.

(Step 1) The controller 12 of the C-plane 10 receives a timing for establishing a call, for example, a call establishment request from a user equipment.

(Step 2) The controller 12 of the C-plane transmits, to the controllers 22 and 32 of the U-plane and the T-plane, an alarm output request of the call from a particular user. The call from this particular user is identified by a user identifier.

(Steps 3) Meanwhile, the process entity L1 which detected the error notifies the error occurrence to the process entity L2 of an upper layer.

(Step 4) The process entity L2 notifies this to the process entity L3 of a further upper layer.

(Step 5) The process entity L3 notifies this to the controller 22.

(Step 6) After receiving the error notification from the process entity, the controller 22 of the U-plane notifies the error occurrence to the controllers 12 and 32 of other planes (Step 6).

(Step 7) The controller 22 of the U plane stores the alarm information including the user identifier, the subunit identifier, the process entity name in which the error occurred and the cause of error into the storage device 40.

(Step 8) The operator analyzes the alarm information stored in the storage device 40.

Conventionally, the operator investigated the cause of error based on collected information into the storage device 40 in Step 7 described above.

In this embodiment, the controller of each subunit extracts the information only related to entities which caused the error in the specified user's specified call on the basis of the table and stores the storage device. Since the collected information does not contain the information not directly related to the error, its quantity is small. Therefore, the communication operator can identify quickly the parts which caused the error in the specified call of the specified user.

In the present embodiment, the controller within the subunit of each plane includes a table as described below. In other words, the controller includes a table which indicates the relationship between the combination of the message name and the service identifier of the call which is set up using the message; and the name of the process entity which processes the call. Here, a "message name" means "the name of the message transmitted and received by the C-plane 10 to and from the outside in order to set up a call using the message. For example, the names of the process entities are L1, L2 and L3 in FIG. 1. Upon detection of failure in any of the subunits of the C-plane 10, the controller 12 within the subunit sends an error notification to the controller in each plane. The error notification includes the message name of the call with a failure detected, the user identifier of the call, and the service identifier of the call.

In response to the error notification, the controllers 12, 22 and 32 of respective planes including the C-plane 10 searches the process entity name from the table, based on the message name and the service identifier within the error notification. Then the controllers store the alarm information into the storage device 40. The alarm information includes the user identifier, the subunit identifier, and the process entity name.

Figure 2:
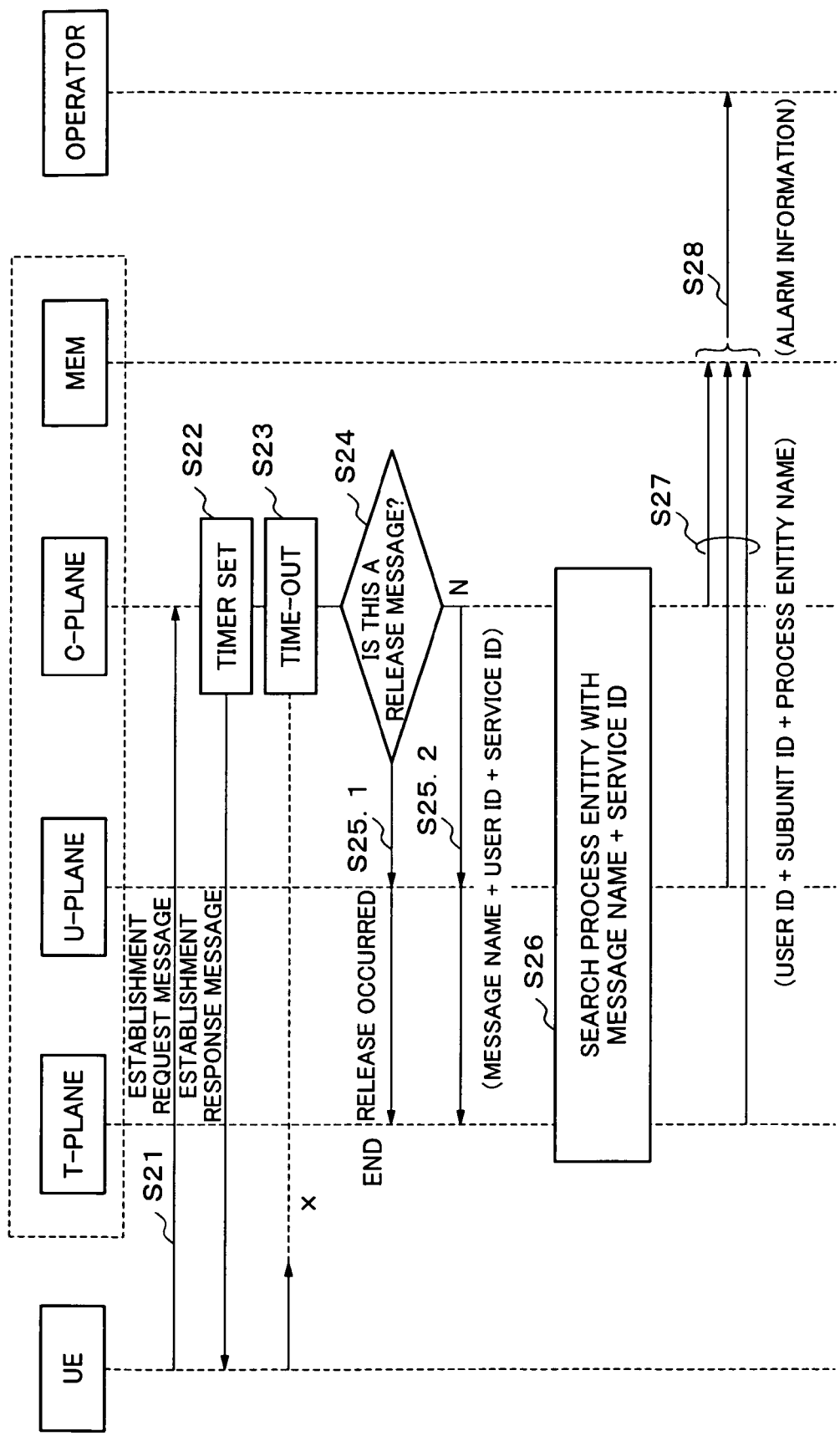
FIG. 2 is a flow chart describing an alarm information collecting process in case of failure occurrence when establishing a call from the user terminal.

Next, an embodiment will be described referring to FIGS. 2 and 3, for an exemplary case in which a failure occurred when establishing a call between the base station controller and the user equipment. FIG. 2 illustrates the process flow of collecting alarm information upon occurrence of failure when establishing a call from the user equipment, and FIG. 3 illustrates an example of a table used in the present invention.

In FIG. 2, a user equipment 1 transmits, in step 21, a call establishment request message to a base station controller 2. The call establishment request message includes call-setup, call-release, hand-off request, or the like. The controller 12 of the C-plane 10 then transmits, in step S22, an establishment response message to the user equipment 1 and sets the message request-response timer.

Here, it is assumed that the user equipment 1 did not respond to the establishment response message within a preset time period due to a failure of some kind.

At this time, the controller 12 of the C-plane 10 determines that the timer timed-out, in step S23. Subsequently, the controller determines, in step S24, whether or not the timed-out message is a release-message. In the case that the message is a release-message, i.e., the message received in step S21 is a call release notification (e.g., "end of call") from the user equipment, the controller 12 of the C-plane 10 notifies, in step S25.1, the controllers 22 and 32 of other planes that a release occurred and terminates the operation, since the base station controller does not need to collect alarm information.

If the result of determination in step S24 is "NO", the controller 12 transmits, in step S25.2, an error notification to respective controllers 22 and 32 of the U-plane and the T-plane. As described above, the error notification includes a message name received in step S21, a user identifier, and a service identifier.

Next, in step S26, the controllers 12, 22 and 32 of respective planes search a table in each controller with the message name and the service identifier as the search key to obtain a corresponding process entity name.

Next, in step S27, the controllers 12, 22 and 32 of respective planes store the alarm information into the storage device 40. The alarm information includes, as described above, the user identifier, the subunit identifier, and the process entity name. The operator retrieves the collected alarm information from the storage device 40 at a desired timing.

In the above embodiment, an exemplary operation in case of failure when requesting a call establishment from the user equipment 1 has been described. However, it is apparent to skilled persons in the art that the present invention can be similarly applied when setting up a call to the user equipment, or transmitting and receiving messages between other nodes.

What is claimed is:

1. A base station controller comprising a C-plane which executes call setup control identified by a user identifier and a service identifier, a U-plane which executes user data transmission process, and a T-plane which executes physical interface termination, wherein
   each plane is provided with a plurality of subunits for each of a series of functions,
   each subunit has a plurality of process entities provided for each function, and a controller for controlling the operation of the process entities and notifying, upon occurrence of an error in any of the process entities, the information to other subunits to execute the necessary error process, and wherein
   in the base station controller of a radio communication network,
   said controller in each plane comprises a table for storing the relationship between the combination of the name of a message transmitted and received by said C-plane to and from a user terminal outside the base station controller in order to set up a call, and the service identifier of the call which is set up using the message; and a name of a process entity which processes the call, and
   upon detection of failure in any of the subunits of said C plane, said C-plane controller sends, to each plane controller, an error notification including the message name of the call in which failure is detected, the user identifier, and the service identifier, wherein a service identifier is used to search a process entity to identify quickly the Parts which caused an error in a specified call of a specified user, and
   the controller of each plane including said C plane searches the process entity name from said table with the message name and the service identifier within said error notification, and outputs alarm information including the user identifier, the subunit identifier, and the process entity name.

2. The base station controller according to claim 1, wherein the message transmitted and received by said C-plane is classified into a normal-message for connecting the call and a release-message for releasing the call, and wherein each plane controller uses the occasion when the normal-message reaches time-out as the condition for outputting said alarm information.

3. The base station controller according to claim 1, wherein, upon detection of failure in multi-call which establishes a plurality of calls for a single call-connection request, said C-plane controller determines which call may be influenced by the failure and sends, to each plane controller, the error notification with regard to the call which may be influenced.

4. The base station controller according to claim 1, wherein, the controllers within the sub-units store the alarm information into a storage device for notifying alarm information to an operator terminal.

5. The base station controller according to claim 1, wherein, the base station controller processes the following three types of calls,
   the first type is a call originated by the user equipment existing in the area controlled by the base station controller itself,
   the second type is a call arrived from a user equipment in another radio/wired communication network, and
   the third type is a call handled by another base station controller.

6. A method for collecting alarm information for use in a base station controller comprising a C-plane which executes call setup control identified by a user identifier and a service identifier, a U-plane which executes user data transmission process, and a T-plane which executes physical interface termination, wherein,
   within the base station controller,
   each plane is provided with a plurality of subunits for each of a series of functions, and wherein
   each subunit has a plurality of process entities provided for each function, and a controller for controlling the operation of the process entities and notifying, upon occurrence of an error in any of the process entities, the information to other subunits to execute the necessary error process,
   said method of collecting alarm information, comprising the steps of:
   preliminarily storing, into said each plane controller, a table indicating the relationship between the combination of the name of a message transmitted and received by said C-plane to and from a user terminal outside the base station controller in order to set up a call, and the service identifier of the call which is set up using the message; and the name of the process entity which processes the call;
   causing a controller within the sub-unit to send, upon detection of failure in any of the subunits of said C plane, to each plane controller an error notification including the message name of the call in which the failure is detected, the user identifier, and the service identifier; wherein a service identifier is used to search a process entity to identify quickly the Parts which caused an error in a specified call of a specified user, and
   causing each plane controller including said C plane to search the process entity name from said table with the message name and the service identifier within the error notification, and to output alarm information including the user identifier, the subunit identifier, and the process entity name.

7. A method for collecting alarm information according to claim 6, wherein, the controllers within the sub-units store the alarm information into a storage device for notifying alarm information to an operator terminal.

* * * * *